(12) United States Patent
Norwood et al.

(10) Patent No.: US 7,289,793 B2
(45) Date of Patent: Oct. 30, 2007

(54) METHOD AND APPARATUS FOR DISPLAYING REAL-TIME INFORMATION OBJECTS BETWEEN A WIRELESS MOBILE USER STATION AND MULTIPLE INFORMATION SOURCES BASED UPON EVENT DRIVEN PARAMETERS AND USER MODIFIABLE OBJECT MANIFEST

(75) Inventors: David Norwood, Roswell, GA (US); Scott Gilbert, 77 Angel Path, Douglasville, GA (US) 30134

(73) Assignee: Scott Gilbert, Douglasville, GA (US)

( * ) Notice: Subject to any disclaimer, the term of this patent is extended or adjusted under 35 U.S.C. 154(b) by 665 days.

(21) Appl. No.: 10/309,642

(22) Filed: Dec. 3, 2002

(65) Prior Publication Data

US 2003/0104830 A1 Jun. 5, 2003

Related U.S. Application Data

(60) Provisional application No. 60/337,416, filed on Dec. 3, 2001.

(51) Int. Cl.
*H04M 3/42* (2006.01)

(52) U.S. Cl. .................. 455/414.1; 455/418; 455/517; 455/3.01

(58) Field of Classification Search ............. 455/517, 455/3.01, 3.03, 422.1, 434, 432.3, 446, 556.2, 455/556.1, 557, 566, 412.1, 412.2, 413, 414.4, 455/419, 418, 420, 67.11, 67.16, 502, 503, 455/515, 434.3, 414.1, 414.3; 715/500.1, 715/501.1; 370/252, 253, 241, 474, 503, 370/509; 709/232, 203

See application file for complete search history.

(56) References Cited

U.S. PATENT DOCUMENTS

| | | | | |
|---|---|---|---|---|
| 5,061,916 A | * | 10/1991 | French et al. | 340/522 |
| 6,665,835 B1 | * | 12/2003 | Gutfreund et al. | 715/500.1 |
| 6,718,168 B2 | * | 4/2004 | Ala-Luukko et al. | 455/412.1 |
| 2002/0152313 A1 | * | 10/2002 | Nishimura et al. | 709/227 |
| 2002/0161685 A1 | * | 10/2002 | Dwinnell | 705/36 |
| 2003/0051253 A1 | * | 3/2003 | Barone, Jr. | 725/112 |
| 2004/0024812 A1 | * | 2/2004 | Park et al. | 709/203 |
| 2004/0133467 A1 | * | 7/2004 | Siler | 705/14 |
| 2004/0205478 A1 | * | 10/2004 | Lin et al. | 715/500.1 |

OTHER PUBLICATIONS

Trakus, Inc., "http://demo.trakus.com/dsi/", 433 Broadway, Everett, MA 02149, Phone (617) 544-6070.

* cited by examiner

*Primary Examiner*—Edward F. Urban
*Assistant Examiner*—John J. Lee
(74) *Attorney, Agent, or Firm*—Myers & Kaplan, LLC; Barry E. Kaplan; George P. Bonanto

(57) ABSTRACT

A method and apparatus for displaying real-time information objects between a wireless mobile user station and multiple information sources based upon event driven parameters and user modifiable object manifest, wherein the multiple real-time information sources and real-time event occurrences are collected, tagged and analyzed for context relevance and transmitted to a wireless mobile computer user based on personal preference and request of the wireless mobile computer user, thus providing a highly personalized experience.

25 Claims, 2 Drawing Sheets

METHOD AND APPARATUS FOR DISPLAYING REAL-TIME INFORMATION OBJECTS BETWEEN A WIRELESS MOBILE USER STATION AND MULTIPLE INFORMATION SOURCES BASED UPON EVENT DRIVEN PARAMETERS AND USER MODIFIABLE OBJECT MANIFEST

CROSS-REFERENCE TO RELATED APPLICATION

To the full extent permitted by law, the present application claims priority to and the benefit as a non-provisional application to provisional patent application entitled "Method and Apparatus for Displaying Real-Time Information Objects Between a Wireless Mobile User Station and Multiple Information Sources Based Upon Event Driven Parameters and User Modifiable Object Manifest" filed on Dec. 3, 2001, having assigned Ser. No. 60/337,416, wherein said application is incorporated herein by reference.

TECHNICAL FIELD

The present invention relates generally to mediums utilized for the transmission and/or broadcasting of audio, visual and textual data and more specifically to a method and apparatus for displaying real-time information objects between a wireless mobile user station and multiple information sources based upon event driven parameters and user modifiable object manifest. The present invention is particularly useful for, although not strictly limited to, effectively relaying real-time sports-related information to attendees of a sporting event. The present invention is also particularly useful for security-related applications, where real-time handheld access to events is of primary concern.

BACKGROUND OF THE INVENTION

From football games to horse racing to car racing, spectator and/or sporting events in general have become a favorite pastime, often attracting a plethora of die-hard, loyal fans. Although live attendance at such events provide visual stimuli adequate to satiate some fans, most fans are typically unimpressed with visual stimuli alone and often eagerly seek other avenues of stimuli to more personalize their experience. Such avenues may include written statistical data of their favorite team, player, car or racing animal, live radio broadcasts and/or televised commentary via portable television units. However, as convenient as these avenues may be, they still inherently fail to fully personalize the spectator's experience by often limiting the spectator to media-dictated coverage of information. As such, the spectator is deprived of information that he/she may deem personally essential and important to his/her full enjoyment of the event.

For instance, the sport of car racing has become an increasingly popular spectator event, attracting tens of thousands of fans who attend to not only watch racecars circle the track at immense speeds, but to also learn about the racing team itself, the driver, driving and/or car conditions that may contribute to the performance of the driver and his car, the telemetry of the car and statistical information of the car. In addition to such data, most spectators typically also enjoy watching interviews with the drivers and/or pit crews. As engaging as all this information is, it often becomes difficult for the spectator to simultaneously watch the race and effectively absorb all the information that may be relayed to him by radio broadcasts, televised commentary via portable television units, statistical data books or any other means of transmission. As such, the spectator is generally overwhelmed and unable to enjoy the event at his/her own pace. This can be especially frustrating if the spectator, while attempting to absorb one piece of information, misses a different but personally important moment of the race (i.e., the cause of a car crash, taking of the lead by another car, etc.) that the media has chosen to not replay via televised or radio transmission. Furthermore, although a spectator may be able to gather missed information in televised post-game/race highlights or via newspapers the following day, much of the spectator's excitement has usually subsided or has been lost entirely due to the lack of real-time information and the inherent spontaneity carried therewith.

Although attempts have been made to provide such real-time information, many such efforts have proven ineffective and/or typically failed in supplying a substantial variety of information and content including real-time audio and visual data, statistical information and full motion video. In addition, most available systems or methods and suppliers of sports information have generally been unable to supply information personalized for each spectator. As such, most such systems usually only provide one stream of uniformly distributed information—selected, controlled and limited by the supplier of the information (i.e., the media). These generic and uniform relays of information typically fail to consider the personal preferences and behaviors of each spectator and instead supply a broad array of information that may only facially touch on aspects of the event that spectators have deemed relevant and worthy of in-depth coverage.

For example, although wireless mobile computer users today have access to wireless content/information, such access is generally limited in the type and amount of content/information provided. Specifically, since the primary method utilized by mobile users to acquire content is through various manners of wired based synchronization between the user mobile station and base system, the content downloaded onto the user station is typically static text and still images, possibly enhanced with the inclusion of simple animated objects. Moreover, the vast majority of content acquired by the use of wired based synchronization can be material hours and even days. Such a method is clearly disadvantageous, as it fails to provide immediate, real-time full-motion video, audio or textual information.

Newly available technologies incorporating the use of 802.11, BLUETOOTH and/or 3G network protocols embedded within low cost radio transceivers have expanded the ability of wireless Internet access, thereby substantially increasing the amount of available content/information. Moreover, because such technologies provide high bandwidth data throughput to mobile computer stations, the information relayed to a wireless mobile computer user is transmitted with virtually no delay in time. As such, the mobile user is able to immediately access the current environment/conditions of an event in real-time. Systems failing to incorporate such technology are becoming obsolete due to the ability of the new technology to deliver real-time information to an individual user of a wireless mobile computer/unit.

Therefore, it is readily apparent that there is a need for a method and apparatus for displaying real-time information objects between a wireless mobile user station and multiple information sources based upon event driven parameters and user modifiable object manifest, wherein such real-time information includes, but is not strictly limited to visual, audio and textual data presented to a wireless mobile user in a systematic and ad hoc manner based upon the personal preferences and behavior analysis of the wireless mobile user.

BRIEF SUMMARY OF THE INVENTION

Briefly described, in a preferred embodiment, the present invention overcomes the above-mentioned disadvantages, and meets the recognized need for such a device by providing a method and apparatus for displaying real-time information objects between a wireless mobile user station and multiple information sources based upon event driven parameters and user modifiable object manifest, wherein such real-time visual, audio and textual data and information is presented to a wireless mobile user in a systematic and ad hoc manner based upon the personal preferences and behavior analysis of the wireless mobile user.

According to its major aspects and broadly stated, the present invention in its preferred form is a method and apparatus for displaying real-time information objects between a wireless mobile user station and multiple information sources based upon event driven parameters and user modifiable object manifest having software designed to accept multiple simultaneous digitally and/or analog encoded streams of information and "chunk" them into meaningful historical segments for future distribution as real-time information to wireless mobile computer users based upon predefined mobile user controls and mobile user personal preferences.

More specifically, the present invention is a method and apparatus for displaying real-time information objects between a wireless mobile user station and multiple information sources based upon event driven parameters and user modifiable object manifest having software designed to accept multiple simultaneous digitally and/or analog encoded streams of information from venue, media or Internet related sources, convert the analog streams of information into MPEG format and conform the digital streams of information into MPEG standard and save such information to a main server. Thereafter, the information in the server is collated and aggregated (i.e., "chunked") into meaningful historical segments for future distribution as real-time segments of information to wireless mobile computer users based upon predefined mobile user controls and/or mobile user personal preferences. Desired information from the server is communicated/transmitted to a wireless mobile computer user via radio waves, satellites or any other suitable transmission means and is based on personal requests, predefined user controls or any other basis in accord with the personal preferences of the wireless mobile computer user.

Essentially, the present invention relates to information processing, advanced storage and retrieval of audiovisual data objects, text document objects, graphic image objects, database objects, electronic mail objects, telemetry of physical objects that have mass, velocity and direction, Internet Relay Chat, and any other objects commercially available on the world wide web, intranet(s), extranet(s), or internet(s). These objects are then stored, disseminated, tagged, sorted, manipulated, filtered, parsed; and sent via a wireless campus-wide network to handheld personal data assistant devices.

A feature and advantage of the present invention is its ability to enable the presentation of real-time occurrences based upon actual events, personal preferences and predefined user controls.

A feature and advantage of the present invention is its ability to accept multiple simultaneous digitally encoded streams of information and "chunk" them into meaningful historical segments.

A feature and advantage of the present invention is its ability to allow a user to configure how information is segmented, thus enabling the user to present the events as they actually happened and in an optimized manner for the user.

A feature and advantage of the present invention is its ability to be used not only in connecting to the wireless Internet, but to any other network communication system such as, for exemplary purposes only, an Intranet or other similar interactive communication systems.

A feature and advantage of the present invention is its ability to provide unique perspectives of information and a substantial variety of content/information ranging from simple text to full motion video.

A feature and advantage of the present invention is its ability to enable wireless mobile users to access real-time information of a spectator event such as, for exemplary purposes only, an automotive racing event, wherein such real-time information could include, but is not limited to, audio from driver interviews, pit crew conversations, video of race coverage as well as telemetry and statistical information of the car, driver and team.

A feature and advantage of the present invention is its ability to enable wireless mobile users to access real-time information covering a security-sensitive venue such as, for exemplary purposes only, an olympics event, wherein such real-time information could include, but is not limited to, audio from police and security traffic, security personnel conversations, video from security cameras as well as telemetry and statistical information from automatic personnel locators and tracking devices.

A feature and advantage of the present invention is its ability to enable wireless mobile users to go to any point in the past and see an event at that selected time. For instance, if a user comes to a race an hour late and wants to see an accident that occurred 30 minutes earlier, the user can view any moment in the past as well as the present.

A feature and advantage of the present invention is its ability to present to a wireless mobile computer user information based upon the personal preferences and behavior analysis of the wireless mobile computer user.

A feature and advantage of the present invention is its ability to deliver highly synchronized content to the event participant.

A feature and advantage of the present invention is its ability to reduce and even eliminate time delays in the transmission of information to a wireless mobile computer user at an event, thereby providing real-time, event-synchronized audio, visual, textual and related forms of information.

A feature and advantage of the present invention is its ability to introduce and transmit to a wireless mobile computer user, in a commercial context, information related to advertisers, promoter, sponsors and/or partners of the spectator event.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

Figure 1:
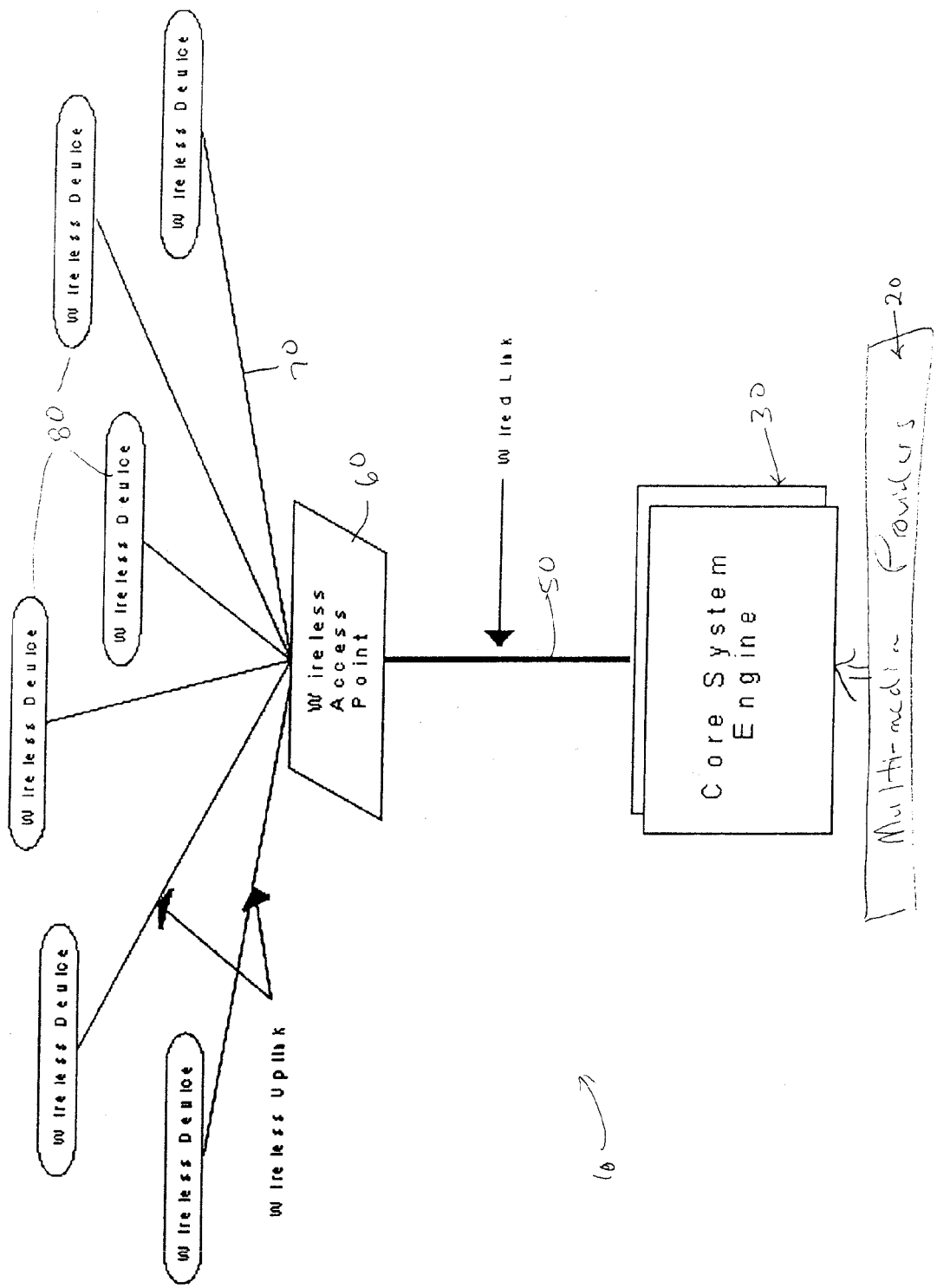
FIG. 1 is a schematic diagram of a method and apparatus for displaying real-time information objects between a wireless mobile user station and multiple information sources based upon event driven parameters and user modifiable object manifest according to a preferred embodiment of the present invention showing interconnected wireless stations communicating with a media control server.
Figure 2:
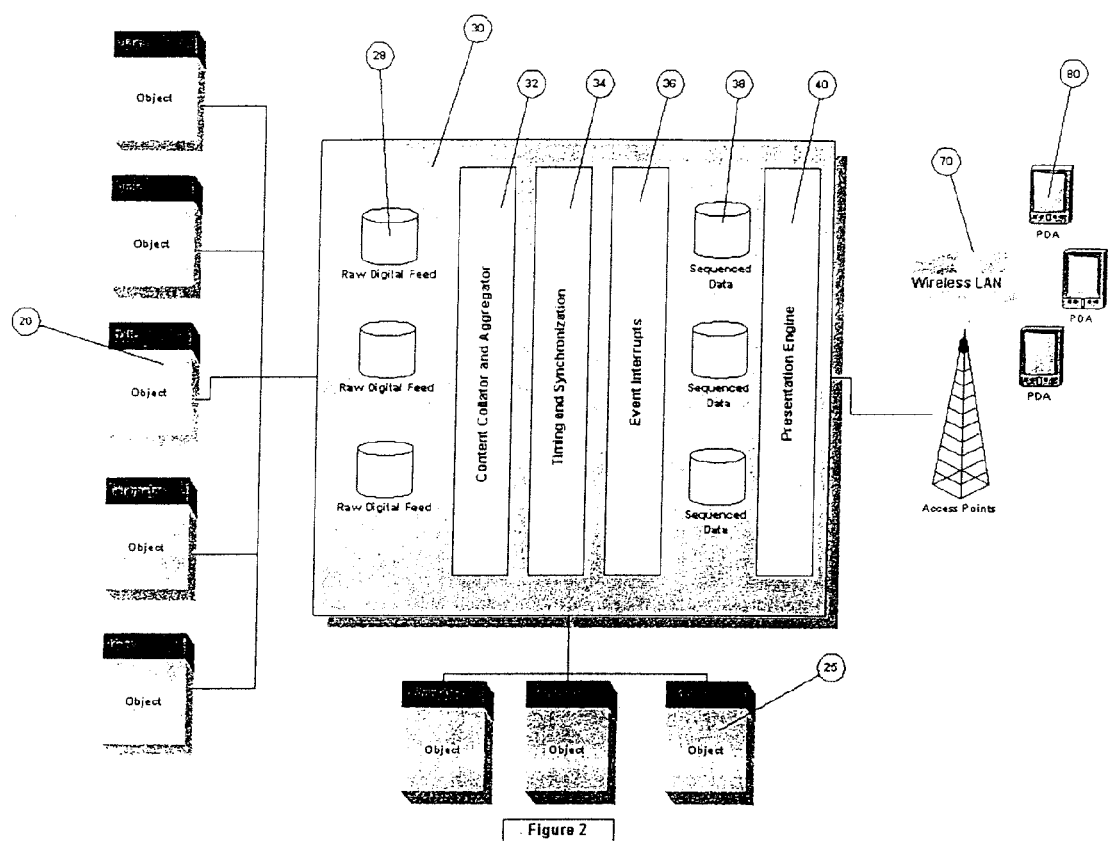
FIG. 2 is a schematic diagram of a method and apparatus for displaying real-time information objects between a wireless mobile user station and multiple information sources based upon event driven parameters and user modifiable object manifest according to a preferred embodiment of the present invention showing an event driven content delivery.

In describing the preferred and alternate embodiments of the present invention, as illustrated in FIGS. 1-2, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-2, the present invention in its preferred embodiment is a method and apparatus 10, wherein method and apparatus 10 is preferably a method and apparatus for displaying real-time information objects between a wireless mobile user station and multiple information sources based upon event driven parameters and user modifiable object manifest having a multimedia provider 20, a media control server 30, a wired link 50, a wireless access point 60, wireless uplinks 70 and wireless displays 80.

Specifically, multimedia provider 20 preferably includes event-based real-time content streams of analog and digital multimedia transmission, such as, for exemplary purposes only, audio, video, textual, statistical, news and telemetry transmissions of and relating to every aspect of the spectator event and its participants (i.e., athletes, racecar drivers, coaches, security personnel, etc.). Furthermore, venue-owned media and audio streams, as well as global and/or localized networking systems, preferably provide the real-time content streams. A static content provider 25 also preferably provides analog and digital multimedia transmission preferably in the form of advertisements from sponsors and/or partners in support of the spectator event. Commerce related advertisements and/or any other type and form of advertisement is also preferably provided by static content provider 25. The analog and digital multimedia transmissions of multimedia provider 20 and static content provider 25 are thereafter preferably transmitted to media control server 30 preferably via wired link or any other suitable vehicle of transmission such as, for exemplary purposes only, wireless or satellite transmission.

Media control server 30 is preferably a commercially available computer using an Intel, DEC Alpha, Sun SPARC, Apple, AMD, or other commercially available RISC or CISC Central Processing Unit. Furthermore, the media control server 30 software is preferably generated using XML, HTML, WML, and JAVA open source-programming languages, or any other suitable open source-programming languages. Additionally, Commercial Database Functionality capable of supporting SQL standard also preferably exists on media control server 30. Any other commercially available software including any operating system can be present on media control server 30.

Analog multimedia signals sent to media control server 30 by multimedia provider 20 and static content provider 25 are preferably first converted by media control server 30 to an MPEG digital compressed format, including, but not limited to, MPEG-1, MPEG-2, MPEG-3 and MPEG-4 formats, so as to code all the audio-visual information (e.g., movies, video, music, sound, commentary, etc.). Alternatively, other suitable digital compressed formats can be used. Digitally compressing the analog multimedia signals into real-time encoding is preferably handled by the insertion of an analog-to-MPEG encoding card into media control server 30, wherein the analog-to-MPEG encoding card is preferably commercially available for insertion into Intel CPU Based Servers and is also preferably available to other CPU type server architectures. Such commercially available analog/digital-to-MPEG cards acquire images from scanners, digital cameras, video cameras, audio microphones, TV/VCR, CD and DVD signals and convert the signals to digital standards such as MPEG or QuickTime.

Digital multimedia signals sent to media control server 30 by multimedia provider 20 and static content provider 25 are also preferably made to conform to the governing digital format, preferably MPEG standard. Digital multimedia signals can also be converted to the MPEG standard via commercially available conversion software and/or developed in JAVA or another open source programming language. Commercially available software exists to convert QuickTime, WAV, WMA, MP3 and other published multimedia standards to MPEG format.

Preferably, all multimedia signals sent to media control server 30 will be real-time or time-delayed signal of an event or conditions surrounding the event. Media control server 30 will then preferably save all multimedia signals to a computer hard drive of media control server 30 in preferably an MPEG digital format. Additionally all multimedia information will be time stamped in at least one-minute intervals for the purpose of retrieving and viewing this data stream based on time and specific qualitative and quantitative characteristics of the saved multimedia event. This enables the user to go to any point in the past and see the event at that selected time. For instance, if a user comes to a race an hour late and wants to see an accident that occurred 30 minutes earlier, the user can view any moment in the past as well as the present.

Media control server 30 further preferably comprises a content collator and aggregator software program 32 that preferably parses the saved digital information into usable segments of the original information for the purpose of identifying time slices or other conditions. Furthermore, each piece of segmented saved digital information is preferably accorded an additional time header file via a timing synchronization software program 34 such that a moment in time of the spectator event can be used to reference a specific data point in the corresponding multimedia file. Each segmented and time-synchronized piece of saved digital information is then interrupted via an event interrupt engine software program 36 and thereafter saved in individual date files or slots 38 for feeding into a personalization layer software program 40, wherein personalization layer software program 40 preferably functions to supply various pieces of time-synchronized information to a wireless mobile computer user based on a user's personal preferences or predefined parameters of desired real-time information.

Segmented and time-synchronized piece of saved digital information are preferably transmitted from personalization layer software program 40, and media control server 30 in general, to a wireless access point 60 preferably via a wired link 50. Wireless access point 60 preferably serves to distribute to wireless displays 80 personalized information and/or specific points in a digital information as requested by a user of a wireless display 80 or any other suitable wireless mobile computers/stations/units. Wireless access point 60 distributes such information to wireless displays 80 preferably via wireless uplinks 70. Furthermore, the algorithm utilized to efficiently reference a specific point in a digital information object in MPEG format to a specific point of the time header file is preferably developed in JAVA or other suitable open source programming languages. Wireless access point 60 is preferably any suitable wireless access point, such as, for exemplary purposes only, Wi-Fi access points (802.11), or 2G or 3G wireless network architecture including, without limitation, wideband code division multiple access (WCDMA), code division multiple access 2000 (CDMA2000), universal mobile telecommunications system (UMTS), and enhanced data for global evolution (EDGE). Moreover, wireless displays 80 preferably connect to wireless access point 60 via standard communication protocols such as, for exemplary purposes only, IEEE 802.11b, IEEE 802.11a, IEEE 80.11 g and/or BLUE-TOOTH.

The type of multimedia information delivered by method and apparatus 10 can include, but is not limited to, spectator sporting events, non-spectator sporting events, operation of security cameras or systems including audio, video and telemetry components as well as operation of cameras for information purposes in a commercial environment.

Media control server 30 can additionally be linked to global networking systems, such as the World Wide Web, via Transmission Control Protocol/Internet Protocol (TCP/IP) for the purpose of obtaining publicly available content and/or for the purpose of supporting Internet Relay Chat (IRC, mIRC) between multiple wireless displays 80. Furthermore, media control server 30 can also be linked to an event sponsor or venue for the purpose of obtaining non-multimedia data such as, for exemplary purposes only, text, graphics, event object telemetry and pictures.

Media control server 30 further preferably receives, stores, and forwards electronic mail content in either a non-secured format or encrypted format using technology such as Pretty Good Privacy (PGP). PGP is a commercially available program that will allow users to encrypt data and E-Mail messages, for privacy, and authentication. When sending electronic data to and receiving electronic data from wireless displays 80, the software used to display this electronic data on each of wireless displays 80 can be supplied by the vendor of wireless displays 80, Personal Data Assistant Operating Systems or can alternatively be developed using XML, HTML, WML, and JAVA open source programming languages or any other suitable source programming languages.

Wireless displays 80 are preferable mobile wireless computers, stations or units such as for exemplary purposes only, personal data assistants. Wireless displays 80 preferably possess software capable of communicating to and with media control server 30 for the purpose of retrieving and displaying from media control server 30 event-related streaming audio media (MPEG), streaming video media (MPEG), streaming audio-video media (MPEG), corporate and not-for-profit advertising (MPEG, graphic, and/or text), text or multi-media (MPEG) messages from the spectator event or Venue to a wireless display 80 user, Internet Relay Chat content (instant messages), Venue geographic information including, but not limited to, maps and weather, Venue safety information, Venue rules and bylaws, event rules and bylaws as well as any other event related content including, but not limited to, database capable data such as sports related scoring or object telemetry that is owned or licensed by the Venue and its agents or assignees where legal and applicable.

Software of wireless displays 80 is preferably generated using XML, HTML, WML, and JAVA open source programming languages or any other suitable open source programming languages. The software is preferably maintained on individual wireless displays 80, wherein each of wireless displays 80 can be owned by a manufacturer/supplier and its agents or assignees, by the venue, by the event sponsor or by individuals or other such entities legally allowed to view the event.

Software of wireless displays 80 will further preferably notify media control server 30 of all content being viewed by a user of wireless display 80, thereby enabling the compilation of demographic information relating to the user of wireless display 80.

As software of wireless displays 80 notifies media control server 30 of all content viewed by the user of wireless display 80, media control server 30 will preferably use algorithms preferably developed via XML, HTML, WML, and JAVA open source programming languages to adjust the multi-media information being displayed or available to be viewed in such a manner so as to increase the viewing experience of a user of a wireless display 80. Each wireless display 80 that is linked to media control server 30 preferably invokes media control server 30 to create a relational database table that will preferably track every object displayed and viewed on a wireless display 80. Based on the data held in this relational database table, media control server 30 will preferably add, subtract, or change any multimedia, graphic, or text documents available to a wireless display 80 user.

As an alternate embodiment, the present invention enables wireless mobile users to access real-time information covering a security-sensitive venue such as, for exemplary purposes only, an olympics event, wherein such real-time information could include, but is not limited to, audio from police and security traffic, security personnel conversations, video from security cameras as well as telemetry and statistical information from automatic personnel locators and tracking devices. In addition to real-time information, previous security information based on a period or moment of time in the past can be accessed to provide said security information.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A system for relaying real-time information of a selected event, said system comprising:
   a multimedia provider;
   a media control server;
   a wireless access point; and
   a wireless mobile computer, wherein said media control server receives multimedia transmissions, stores said multimedia transmissions as digital multimedia signals, time-stamps each said digital multimedia signal at pre-selected time intervals for facilitating selective retrieval of said digital multimedia signals, parses said digital multimedia signals into useable segments of digital information for identifying time slices of the event, and accords a time header file for each of said useable segments of digital information, whereby each moment in time of the event may be used to reference a specific data point in a corresponding one of said useable segments of digital information.

2. The system of claim 1, wherein said multimedia provider provides said multimedia transmissions, said multimedia transmissions comprising a real-time content stream of multimedia transmission of the event or conditions surrounding the event, said multimedia transmission selected from the group consisting of analog multimedia transmissions, digital multimedia transmissions, and combinations thereof.

3. The system of claim 2, further comprising a static content provider, wherein said static content provider provides said multimedia transmissions, said multimedia transmissions comprising an advertising multimedia transmission for the event or conditions surrounding the event, said advertising multimedia transmission selected from the group consisting of analog multimedia transmissions, digital multimedia transmissions, and combinations thereof.

4. The system of claim 3, wherein said multimedia transmission and said advertising multimedia transmission are transmitted to and processed by said media control server as digital multimedia signals selected from the group consisting of real-time signals of the event, time-delayed signals of the event, and combinations thereof.

5. The system of claim 1, wherein said media control server comprises a content collator and aggregator software program for parsing said stored digital multimedia signals into said useable segments of digital information for identifying time slices of the event.

6. The system of claim 1, wherein said media control server comprises a timing synchronization software program for according said time header file for each said segment of digital information so that each moment in time of the event can be utilized to reference a specific data point in a corresponding time-synchronized segment of digital information.

7. The system of claim 1, wherein said media control server comprises an event interrupt engine software program for interrupting each of said time-synchronized segments of digital information.

8. The system of claim 7, wherein each of said interrupted segments of digital information is saved in individual date files for feeding into a personalization layer software program of said media control server, wherein said personalization layer software program functions to supply various ones of said time-synchronized segments of digital information to a user of said wireless mobile computer based upon the user's personal preferences or predefined parameters of desired real-time information.

9. The system of claim 8, wherein said time-synchronized segments of digital information are transmitted from said personalization layer software program and said media control server in general to said wireless access point, wherein said wireless access point functions to distribute said time-synchronized segments of digital information to said wireless mobile computer based upon the user's personal preferences or predefined parameters, thereby permitting the user of said wireless mobile computer to selectively retrieve any of said segments of digital information.

10. The system of claim 9, wherein software configured on said wireless mobile computer notifies said media control server of all said segments of digital information retrieved by the user of said wireless mobile computer, thereby enabling said media control server to create a relational database table that tracks each of said segment of digital information retrieved by the user via said wireless mobile computer.

11. The system of claim 10, wherein data held in said relational database table is utilized by said media control server to control, adjust, regulate, add, subtracts or change any said digital multimedia signal or said segment of digital information made available through said wireless access point for retrieval by the user of said wireless mobile computer, thereby personalizing the type or amount of said digital multimedia signals or said segments of digital information retrievable by the user of said wireless mobile computer.

12. The system of claim 1, wherein the real-time information is selected from the group consisting of spectator sporting events, non-spectator sporting events, audio information, video information, event object telemetry information, global networking system information, Internet Relay Chat, event sponsor information, non-multimedia data, electronic mail content, event-related streaming audio media, streaming video media, streaming audio-video media, corporate advertising, not-for-profit advertising, venue geographic information, venue maps, venue weather conditions, venue safety information, venue rules, venue bylaws, event rules, event bylaws, real-time information covering a security-sensitive venue, audio from security traffic, security personnel conversations, video from security cameras, telemetry information from automatic personnel locators, statistical information from automatic personnel locators, telemetry information from tracking devices, and statistical information from tracking devices.

13. A system for relaying real-time information of a selected event, said system comprising:
  a multimedia provider for multimedia information;
  a media control server for converting said multimedia information into digital information;
  a wireless access point for receiving said digital information; and
  a wireless mobile computer for retrieving said digital information from said wireless access point,
  wherein said wireless mobile computer is adapted to notify said media control server of all said digital information being retrieved by a user of said wireless mobile computer, thereby enabling said media control server to create a relational database table to track all said digital information retrieved by the user of said wireless mobile computer, and wherein the data held in said relational database table is utilized by said media control server to control, adjust, regulate, add, subtract or change any said digital information made available through said wireless access point for retrieval by the user of said wireless mobile computer, thus personalizing the type or amount of said digital information retrievable by the user of said wireless mobile computer.

14. A method of relaying real-time information of a selected event, said method comprising the steps of:
  providing real-time information via a multimedia provider;

transmitting the real-time information to a media control server as a digital multimedia signal for conversion into a segment of digital information;

transmitting said segment of digital information to a wireless access point; and, retrieving a selected segment of digital information from said wireless access point via a wireless mobile computers wherein said segment of digital information comprises a respective time header file so that each moment in time of the event may be utilized to reference a specific data point in a corresponding time-synchronized segment of digital information.

15. The method of claim 14, wherein said multimedia provider comprises a real-time content stream of multimedia transmission of the event or conditions surrounding the event, said multimedia transmission selected from the group consisting of analog multimedia transmissions, digital multimedia transmissions, and combinations thereof.

16. The method of claim 14, further comprising the steps of saving and storing said digital multimedia signal, and time-stamping each digital multimedia signal at pre-selected time intervals for facilitating the selective retrieval of same.

17. The method of claim 14, further comprising the step of utilizing a content collator and aggregator software program to parse said digital multimedia signal into useable segments of digital information for identifying time slices of the event.

18. The method of claim 14, further comprising the step of utilizing a timing synchronization software program for according said time header file for each of said segments of digital information so that each moment in time of the event can be utilized to reference a specific data point in a corresponding time-synchronized said segment of digital information.

19. The method of claim 14, further comprising the step of utilizing an event interrupt engine software program for interrupting each of said time-synchronized segments of digital information.

20. The method of claim 14, wherein the step transmitting said segment of digital information to a wireless access point comprises transmitting a time-synchronized segment of digital information from a personalization layer software program of said media control server to said wireless access point for retrieval by a user of said wireless mobile computer.

21. The method of claim 14, further comprising the step of permitting said wireless mobile computer to notify said media control server of each segment of digital information retrieved by the user of said wireless mobile computer.

22. The method of claim 14, further comprising the step of permitting said media control server to create a relational database table that tracks each said segment of digital information retrieved by the user of said wireless mobile computer.

23. The method of claim 22, further comprising the step of utilizing data held in said relational database table to control, adjust, regulate, add, subtract, or change any said digital multimedia signal or said segment of digital information made available through said wireless access point for retrieval by the user of said wireless mobile computer, thereby personalizing the type or amount of said digital multimedia signals or said segments of digital information retrievable by the user of said wireless mobile computer.

24. The method of claim 14, wherein the real-time information is selected from the group consisting of spectator sporting events, non-spectator sporting events, audio information, video information, event object telemetry information, global networking system information, Internet Relay Chat, event sponsor information, non-multimedia data, electronic mail content, event-related streaming audio media, streaming video media, streaming audio-video media, corporate advertising, not-for-profit advertising, venue geographic information, venue maps, venue weather conditions, venue safety information, venue rules, venue bylaws, event rules, event bylaws, real-time information covering a security-sensitive venue, audio from security traffic, security personnel conversations, video from security cameras, telemetry information from automatic personnel locators, statistical information from automatic personnel locators, telemetry information from tracking devices, and statistical information from tracking devices.

25. The method of claim 14, wherein said wireless access point is is selected from the group consisting of Wi-Fi access points (802.11), 2G wireless network architecture, 2G wideband code division multiple access (WCDMA), 2G code division multiple access 2000 (CDMA2000), 2G universal mobile telecommunications system (UMTS), 2G enhanced data for global evolution (EDGE), 3G wireless network architecture, 3G wideband code division multiple access (WCDMA), 3G code division multiple access 2000 (CDMA2000), 3G universal mobile telecommunications system (UMTS), and 3G enhanced data for global evolution (EDGE).

* * * * *